United States Patent [19]
Suzuki et al.

[11] Patent Number: 5,892,608
[45] Date of Patent: Apr. 6, 1999

[54] OPTICAL RECEIVER DEVICE FOR DARK SOLITON LIGHTWAVE

[75] Inventors: Masatoshi Suzuki, Kawashima-Saitama; Noboru Edagawa, Tokyo; Hidenori Taga, Sakado; Shu Yamamoto, Shiki; Shigeyuki Akiba, Tokyo, all of Japan

[73] Assignee: Kokusai Denshin Denwa Kabushiki Kaisha, Tokyo, Japan

[21] Appl. No.: 770,455

[22] Filed: Dec. 20, 1996

Related U.S. Application Data

[62] Division of Ser. No. 372,668, Jan. 13, 1995, Pat. No. 5,625,479.

[30]     Foreign Application Priority Data

Jan. 27, 1994 [JP] Japan ..................................... 6-23554

[51] Int. Cl.$^6$ .................................................. H04B 10/06
[52] U.S. Cl. ........................................... 359/189; 359/157
[58] Field of Search ..................................... 359/157, 189, 359/181, 193, 135, 108

[56]     References Cited

U.S. PATENT DOCUMENTS

5,020,050  5/1991  Islam ........................................ 359/135

*Primary Examiner*—Kinfe-Michael Negash
*Attorney, Agent, or Firm*—Burns & Lobato, P.C.; Emmanuel J. Lobato

[57]     ABSTRACT

An optical transmitter which reverses the ON-OFF state of the optical intensity of a bright soliton lightwave and generates a dark soliton lightwave having an optical phase shift, an optical receiver for the dark soliton lightwave, and a superfast, high-capacity optical transmission system which is capable of increasing the soliton pulse array density while suppressing timing jitter. The optical transmission system is provided with the optical transmitter which transmits a dark soliton lightwave having digital information, the optical receiver which receives the dark soliton lightwave as a return-to-zero pulse and a transmission optical fiber interconnecting the transmitter and the receiver. The system has a construction in which the transmission optical fiber has, at the wavelength of the transmission lightwave, a normal dispersion value which makes negative the average wavelength dispersion value over the entire length of the optical fiber, and the average value of the wavelength dispersion value and the optical output intensity of the transmission optical fiber have values so that a non-linear optical effect and a wavelength dispersion effect, which are exerted on the transmission lightwave, are balanced with each other.

2 Claims, 12 Drawing Sheets

FIG.12a BRIGHT SOLITON A=1

FIG.12b DARK SOLITON (BLACK SOLITON) A=1, A=1

FIG.12c DARK SOLITON (GRAY SOLITON) A=1/√2, B=−1/√2

OPTICAL RECEIVER DEVICE FOR DARK SOLITON LIGHTWAVE

This is a Divisional of application Ser. No. 08/372,668, filed Jan. 13, 1995, now U.S. Pat. No. 5,625,479.

BACKGROUND OF THE INVENTION

The present invention relates to a transmission system using optical fibers and, more particularly, to a long-distance, large-capacity optical communication system employing dark soliton pulses and optical amplifiers and an optical transmitter and an optical receiver for use in the system.

Buttressed by developments of optical amplifying techniques, optical fiber communication technology has made rapid-paced progress toward ultra-long-distance communication, now allowing implementation of a trans-pacific communication system without the need of using regenerative repeaters. At increased transmission rates, however, conventional transmission systems suffer serious degradation of their transmission characteristics that are caused by the wavelength dispersion characteristic and nonlinear optical effect of optical fibers, imposing severe limitations on the realization of a high-speed, high-capacity transmission system. In recent years, an optical soliton communication system has been in the limelight as a system that will break the bottleneck in the speedup of transmission by the wavelength dispersion characteristic and the nonlinear optical effect.

The optical soliton communication system is a system that positively utilizes the wavelength dispersion characteristic and nonlinear optical effect of optical fibers which are major factors to the degradation of characteristics of the conventional transmission systems and that transmits optical short pulses intact by mutually balancing optical pulse width expansion owing to the wavelength dispersion in the optical fibers and pulse width compression based on the nonlinear optical effect. In case of using, as repeaters, optical amplifiers which compensate for a loss in optical fibers, it is possible to realize soliton communication with practically no waveform variations of optical pulses like ideal soliton pulses, by setting an average power between repeaters and an average dispersion of optical fibers to soliton conditions.

In the optical soliton communication at a high transmission rate of 20 Gb/s or so, optical amplifier noise affects the timing jitter of optical pulses at the receiving end and eventually deteriorates the transmission characteristic. That is, optical soliton pulses with noise superimposed thereon undergo random fluctuations of their optical intensity and slightly departs or differs in shape from ideal optical soliton pulses, causing fluctuations in the shift amount of the carrier frequency by the nonlinear optical effect. Since these operations are repeated for each repeater, the time of arrival of optical pulses randomly fluctuates during their propagation in optical fibers each having a limited dispersion value, incurring the timing jitter at the receiving end. This phenomenon is called the Gordon-Haus effect, which is a major limiting factor to the transmission characteristic of the optical soliton communication. Furthermore, in case of transmission of a plurality of optical soliton pulses carrying digital information, if the repetition period of transmitted soliton pulses is too short, it is observed that adjacent soliton pulses attract or repel each other by virtue of their interactions. This also causes the timing jitter at the receiving end, and hence is not preferable for the application of optical soliton pulses to communications. To suppress the interactions of soliton pulses, it is necessary to widen the space between adjacent soliton pulses to some extent.

With a view to overcoming the timing jitter problem, there have been intensively studied soliton pulse control techniques for artificially reducing the timing jitter, and soliton transmission experiments have made rapid progress in the last few years. There are two approaches to controlling soliton pulses: one is to control a random frequency shift by an optical filter in the frequency domain, and the other is to directly control the timing jitter itself in the time domain. In the prior art, however, these methods involve complex processing using an ultra-narrow optical band-pass filter or an optical modulator in the repeater. This is not desirable from the practical viewpoint such as the long-term stability of the system.

To implement a high-capacity long-distance transmission system employing optical amplifiers, it is important to minimize the complexity of the transmission line including optical amplifiers without providing any special means as in the prior art and to transmit a high-bit-density optical signal with a soliton pulse train of a high bit density.

In the conventional optical soliton communication, there has been used what is so called a bright soliton scheme which transmits short optical pulses in the wavelength band covering an abnormal dispersion range of optical fibers. On the other hand, it is theoretically known that in a case where an ON-OFF reversed signal of optical pulses, that is, a lightwave of a fixed intensity but with a sharp depression in its waveform (dark pulses) is transmitted in the normal dispersion region of optical fibers, if the signal intensity and the pulse width (the width of the depression) of the dark pulses satisfy a certain relationship, the transmission can be achieved with no degradation of the waveform (the shape of the depression) as is the case with the bright soliton lightwave (a. Hasegawa and F. Tappert, Appl. Phys. Lett., Vo. 23, pp. 171–172, 1973); this is called a dark soliton transmission. In this instance, however, it is necessary to provide an optical phase shift at the center of the dark pulses.

Figure 12A:
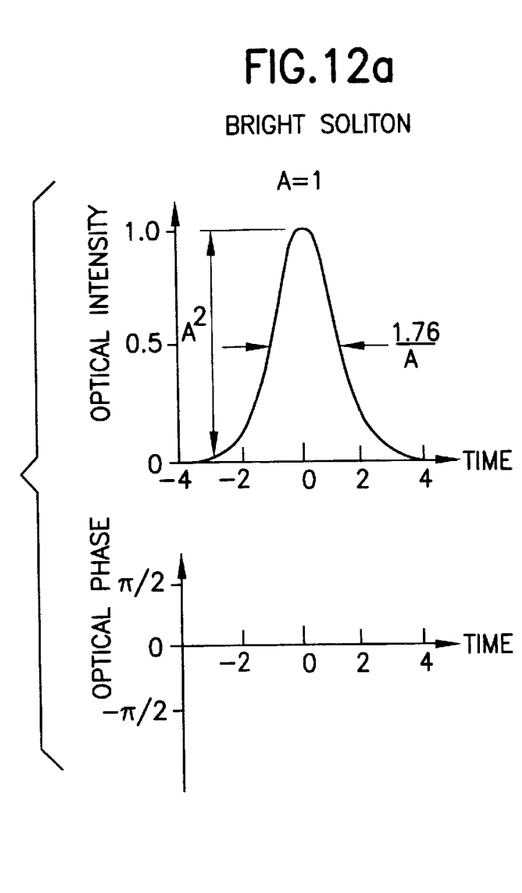
FIG. 12 shows characteristic diagrams explanatory of respective typical examples of bright soliton pulses and dark soliton pulses.
Figure 12B:
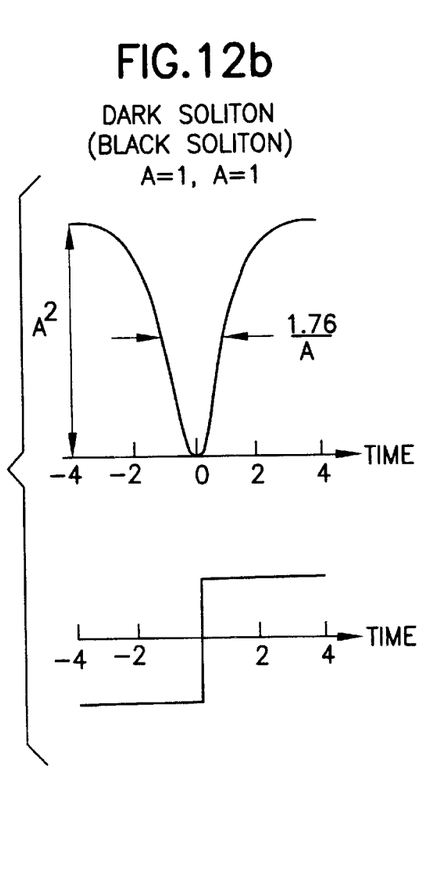
Figure 12C:
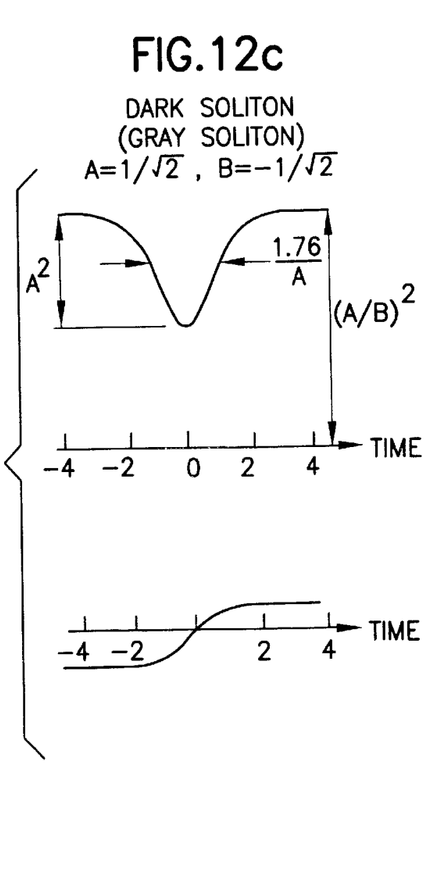

FIG. 12($a$), ($b$) and ($c$) show typical waveforms of bright soliton pulses and dark soliton pulses (J. R. Taylor et al., Optical Solitons-Theory and Experiment, chap. 10, Cambridge University Press, 1992). FIG. 12($a$) shows an example of the bright soliton pulse, which has a constant optical phase. On the other hand, as depicted in FIGS. 12($b$) and ($c$), the dark soliton has features in that the optical intensity has an ON-OFF reversed profile of that of the bright soliton and that of the optical phase shifts. FIG. 12($b$) shows a case where the optical intensity is zero at the bottom of the depression (black soliton), and in this case, the optical phase shifts by $\pi$ at the center of the depression. FIG. 12($c$) shows) a case where the dark pulse goes down to 1/2 of the intensity of CW laser light (gray soliton) and the optical phase shift amount is $\pi/2$. As shown in FIG. 12, A and B are parameters which represent the depth of the depression and the relative level of background light, respectively; A=B=1 corresponds to the black soliton and B approaches zero as the level of the background light increases. The phase shift amount Ps of the dark soliton is given by the following equation by the use of the parameter B.

$$Ps = 2 \sin^{-1}|B|$$

The dark soliton has an advantage over the bright soliton in that it permits reduction of the Gordon-Haus jitter to about 70% and suppression of the soliton interaction. (Y. S. Kivshar, IEEE J. Quantum Electronics, Vol. 29, pp.250–264, 1993). In the past, however, there was not available a transmitter having a generator for the bright soliton lightwave added with digital information and a receiver therefor; hence, no attempts have been made to apply the dark soliton to optical communication.

SUMMARY OF THE INVENTION

It is an object of the present invention to provide a dark soliton superfast, high-capacity optical transmission system which permits prevention of the dark soliton interactions and enhancement of the soliton pulse density while suppressing the timing jitter, through implementing an optical transmitter and receiver for an optical intensity ON-OFF reversed dark soliton lightwave of an ordinary optical soliton (bright soliton) lightwave which has an optical phase shift.

The optical communication system of the present invention comprises: an optical transmitter for transmitting a dark soliton lightwave with digital information; an optical receiver for receiving the dark soliton lightwave as return-to-zero pulses; a transmission optical fiber interconnecting the transmitter and the receiver; and a plurality of optical amplifier repeaters provided on the transmission optical fiber to compensate for a loss caused by them.

In the system, the transmission optical fiber has, at the wavelength of the transmitted lightwave, a normal dispersion value which makes negative the average value of the wavelength dispersion over the entire length of the optical fiber, and the average value of the wavelength dispersion of the optical fiber and the optical output intensity of the optical amplifier repeaters have value so that a non-linear optical effect and a wavelength dispersion effect, which are exerted on the transmitted lightwave, are balanced with each other.

The optical transmitter for use in the present invention is composed of: means for generating a lightwave carrying digital information added to return-to-zero optical pulses; means for emitting a fixed-amplitude output lightwave; an optical gate for outputting an exclusive-OR of two input lightwaves; and an optical phase modulator. The return-to-zero optical signal and the fixed-amplitude lightwave are applied to the exclusive-OR optical gage, wherein the fixed-amplitude lightwave is converted to an ON-OFF reversed lightwave of the return-to-zero optical signal, and the reversed optical signal is modulated by the optical phase modulator which is driven at the transmission rate used. By this, a reversed lightwave is produced which, before and after a time when its optical intensity is minimum, has a phase shift smaller than $\pi$ which constitutes a dark soliton condition.

A first optical receiver is composed of means for generating a fixed-amplitude output light and an optical gate which outputs the exclusive-OR of two optical input signals. The above-mentioned ON-OFF reversed lightwave and a fixed amplitude output light are applied into the exclusive-OR optical gate, wherein the fixed-amplitude output light is converted to a return-to-zero digital lightwave, which is received intact or after being demultiplexed to the original transmission rate.

A second optical receiver has a structure in which: the lightwave transmitted in the transmission optical fiber is branched into two; the one optical lightwave is converted to an electric signal; its clock frequency of the transmission rate or prior to multiplexing is extracted and amplified; and the other lightwave is applied to an optical modulator modulated by its clock frequency signal or a clock frequency of the transmission rate prior to multiplexing to obtain an ON-OFF reversed return-to-zero lightwave of the other lightwave, which is received by one or more optical receivers.

As referred to above, limiting factors to the transmission characteristic of the optical soliton communication using optical amplifiers are the timing jitter by the Gordon-Haus effect and the timing jitter based on the interactions of adjacent soliton pulses. In view of this, according to the present invention: firstly, in the optical transmitting terminal station an ON-OFF reversed lightwave of a bright soliton lightwave is generated which, when its optical intensity is minimum, has a phase shift smaller than $\pi$ which is a dark soliton condition, thereby obtaining a high-density dark soliton lightwave; secondly, the dark soliton lightwave is used as a transmission signal to thereby suppress the timing jitter which results from the interactions of adjacent soliton pulses and the Gordon-Haus effect; thirdly, in the optical receiving terminal station the dark soliton lightwave is converted to an ordinary bright soliton lightwave and the resulting high-density signal is demultiplexed on the time axis, thereafter being received. By this, it is possible to lessen the influence of the timing jitter on the code error rate characteristic.

BRIEF DESCRIPTION OF THE DRAWING

The present invention is described in detail below with reference to the accompanying drawings, in which.

PREFERRED EMBODIMENTS OF THE INVENTION

[Embodiment 1]

Figure 1:
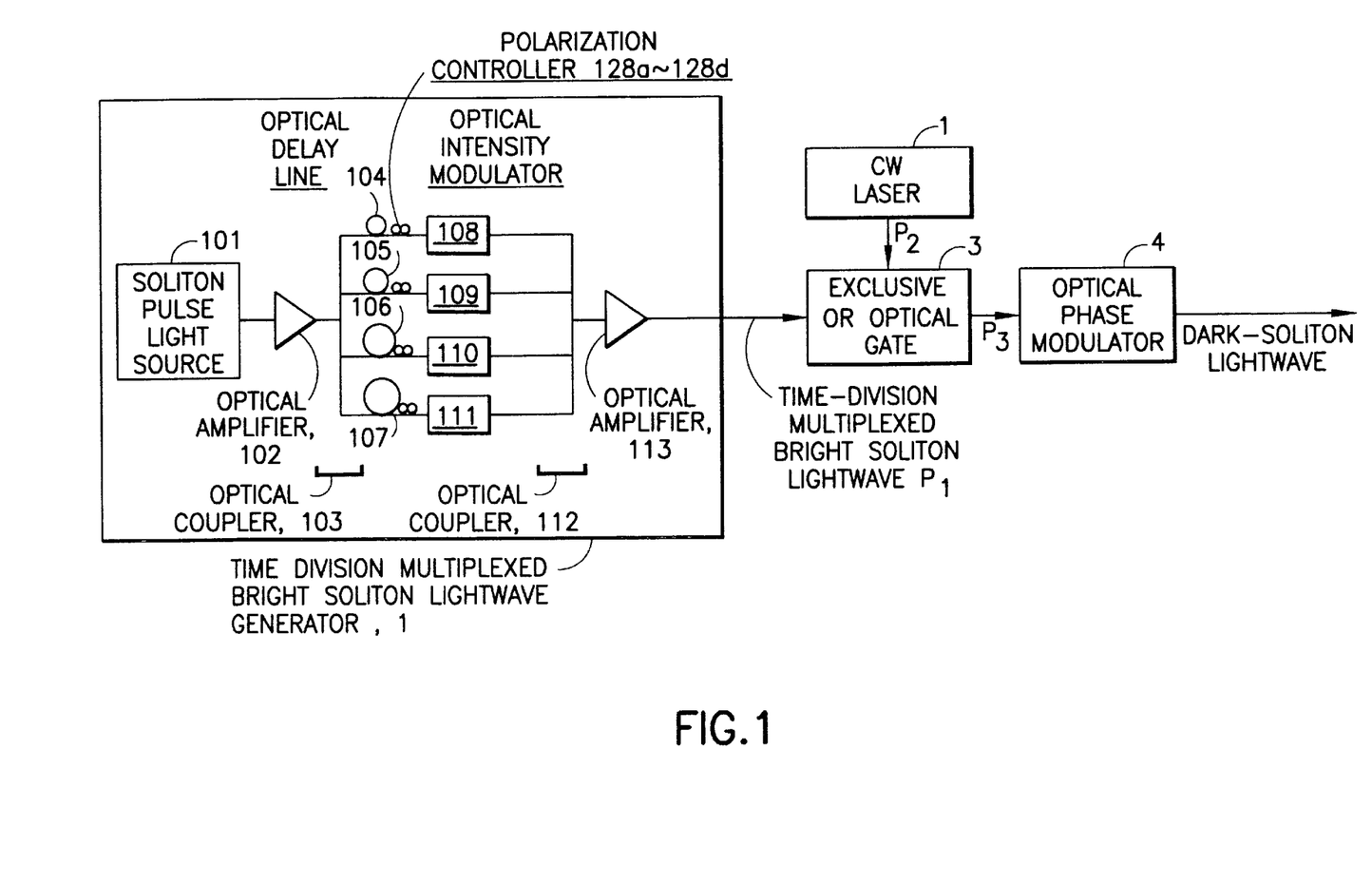
FIG. 1 is a block diagram explanatory of the dark soliton optical transmitter according to Embodiment 1 of the present invention.

With reference to FIG. 1, an embodiment of the optical transmitter according to the present invention is now described. Reference numeral 1 denotes a time-division multiplexed bright soliton lightwave generator, 2 a CW (Continuous Wave) laser, 3 an exclusive-OR optical gate and 4 an optical phase modulator.

The time-division multiplexed bright soliton lightwave generator 1 is composed of: a soliton pulse light source 101; an optical amplifier 102; an optical coupler 103 for branching a pulse train into four; optical delay lines 104, 105, 106 and 107; optical intensity modulators 108, 109, 110 and 111, an optical coupler 112; and an optical amplifier 113 including an optical band-pass filter for removing noise.

The soliton pulse light source 101 generates a soliton pulse train which has a wavelength of 1561 nm, a repetition rate of 5 Gb/s and a pulse width of 10 ps. The soliton pulse train is amplified by the optical amplifier 102 and branched by an optical coupler 103 into four; the branched pulse trains are delayed by 0 ps, 25 ps, 50 ps and 75 ps by the optical delay lines 104, 105, 106 and 107, respectively, and the thus delayed pulse trains are subjected to digital modulation by the optical intensity modulators 108, 109, 110 and 111. The four branched pulse trains are equally polarized under the control of polarization controllers 128$a$, 128$b$ 128$c$ and 128$d$ provided at stages preceding the optical intensity modulators 108, 109, 110 and 111, respectively. The lightwaves of the four systems are combined by the optical coupler 112 into four-multiplexed bright soliton lightwave, which is amplified by the optical amplifier 113.

The time-division multiplexed bright soliton lightwave is applied into a port $P_1$ of the exclusive-OR optical gate 3 and the output light from the CW laser 2 which has a wavelength of 1558 nm is applied to a port $P_2$; the CW laser light is converted to the exclusive OR of the two optical inputs, i.e. an ON-OFF reversed lightwave of the bright soliton, which is outputted from a port $P_3$.

Figure 2:
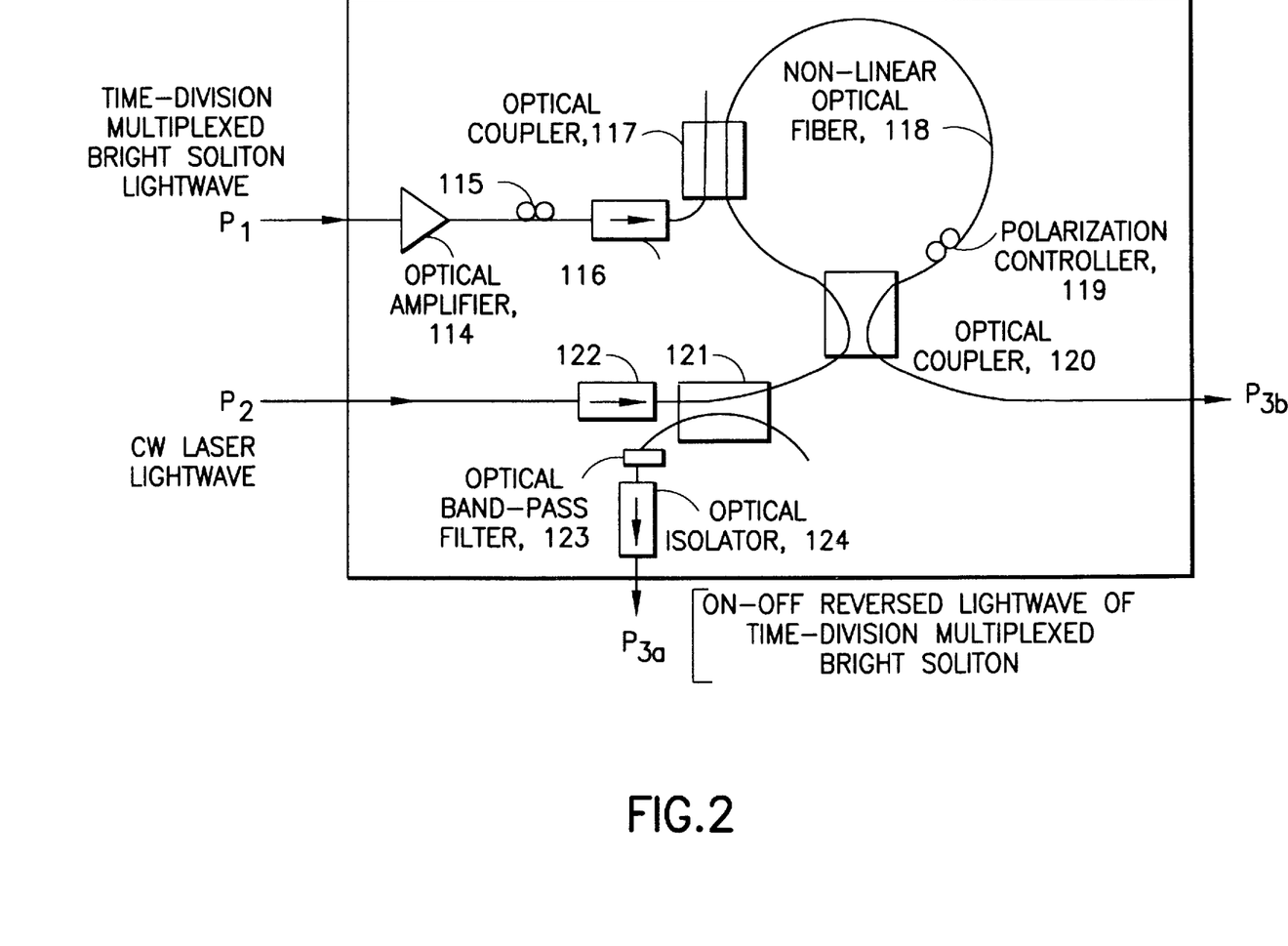
FIG. 2 is a block diagram showing an exclusive-OR optical gate for use in the present invention which employs a non-linear optical loop mirror (a Sagnac interferometer)

FIG. 2 shows an example of the exclusive-OR optical gate 3 formed by an-nonlinear optical fiber (a Sagnac interferometer). The exclusive-OR optical gate 3 is composed of an optical amplifier 114, polarization controllers 115 and 119, optical couplers 117, 120 and 121, optical isolators 116, 122 and 124, an optical band-pass filter 123 and a non-linear optical fiber 118. The branching ratio of the optical coupler 120 is 1:1. A 20 Gb/s time-division multiplexed bright soliton lightwave is input via the port $P_1$ and its average power is amplified by the optical amplifier 114 up to 13 dBm or so, and the amplified lightwave is introduced into the non-linear optical fiber 118 via the polarization controller 115, the optical isolator 116 and the optical coupler 117. The optical fiber 118 is a dispersion-shifted single-mode optical fiber wherein the wavelength dispersion is reduced to substantially zero in the vicinity of a wavelength 1558 nm, the optical fiber having a length of about 10 km. On the other hand, the CW laser lightwave is applied via the port $P_2$ and guided into the optical fiber 118 via the optical isolator 112, the optical coupler 121 and the optical coupler 120. The two output lightwaves to the optical coupler 121 are held in the same state of polarization under the control of the polarization controller 119. When no lightwave is inputted via the port $P_1$, the clockwise and counterclockwise optical lightwaves in the optical fiber 118 return to the port $P_2$ and are outputted via a port $P_{3b}$ via the optical coupler 121, the optical bandpass filter 123 and the optical isolator 124. When the bright soliton lightwave is applied via the port $P_1$ in the same state of polarization as the CW laser lightwave, their refractive indexes change in accordance with their optical intensity owing to the Kerr effect of the optical fiber 118, and as a result, only the CW laser lightwave propagating through the optical fiber 118 counterclockwise is phase modulated by cross phase modulation in accordance with the intensity of the bright soliton lightwave. When the phase change by the interphase modulation is set to a value of $\pi$ at the peak power of the bright soliton lightwave, the CW laser lightwave inputted via the port $P_2$ is entirely outputted to the port $P_{3b}$ at the time corresponding to the peak power of the bright soliton lightwave, and the output to the port $P_{3a}$ is an intensity or ON-OFF reversed lightwave of the bright soliton lightwave with a depression in the CW laser lightwave (dark soliton). That is, the lightwave to the port $P_{3a}$ is the exclusive OR of the bright soliton lightwave and the CW laser lightwave, whereas the output to the port $P_{3b}$ is an AND output of the both input lightwaves.

The dark soliton lightwave is modulated by the optical phase modulator 4 which is driven at 20 Gb/s and by which the phase is shifted by $\pi$ at the center of the depression of the dark soliton lightwave; thus, a lightwave for dark soliton transmission is obtained.

Figure 6:
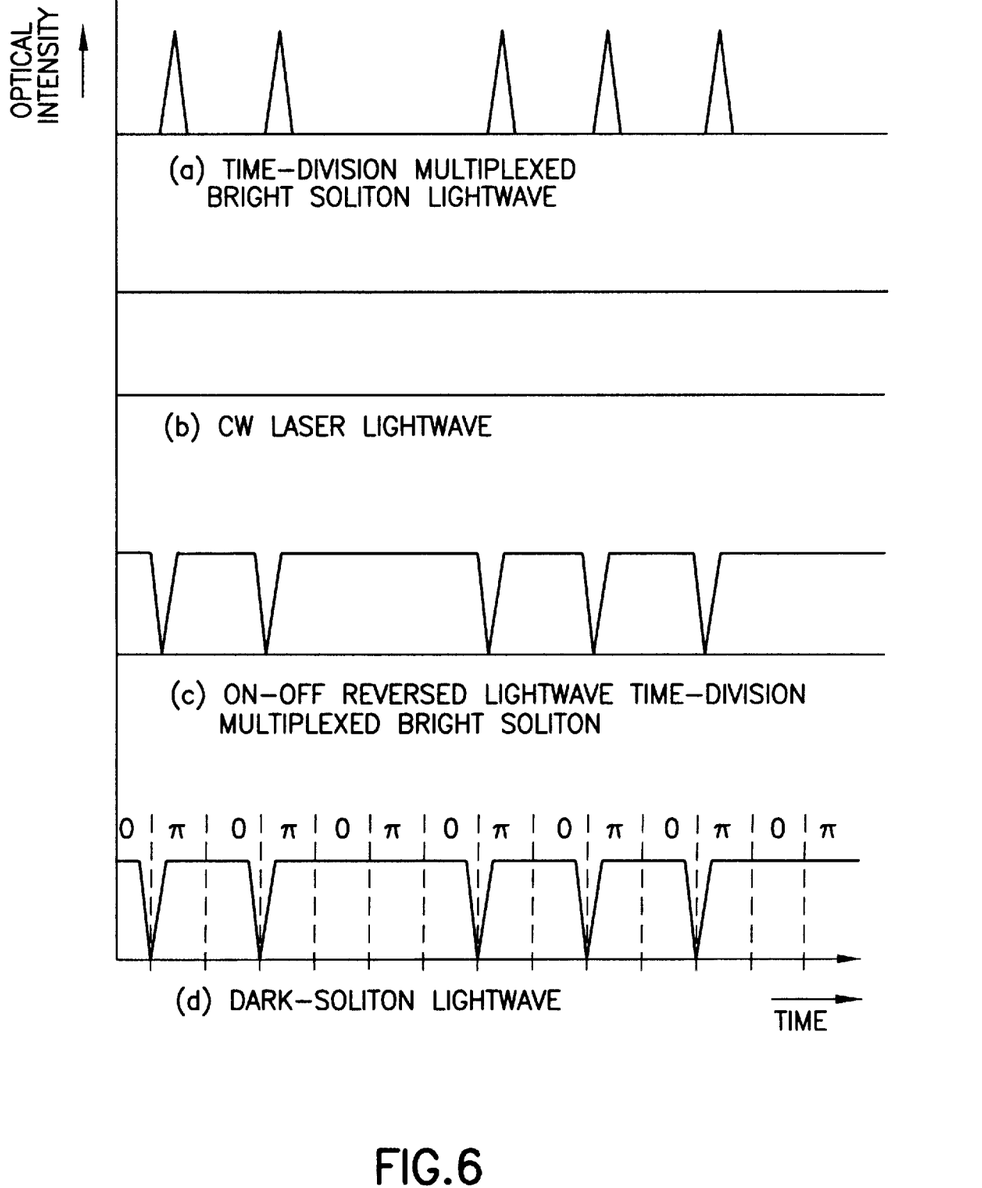
FIG. 6 shows time charts explanatory of the generation of a dark soliton optical pulse signal for transmission.

FIG. 6 shows how the dark soliton lightwave is generated. FIG. 6($a$) is the optical output from the time-division multiplexing bright soliton lightwave generator 1, ($b$) the CW laser lightwave for incidence to the exclusive-OR optical gate 3, ($c$) the lightwave from the port $P_3$ of the exclusive-OR optical gate 3, and ($d$) the dark soliton lightwave outputted from the optical phase modulator 4. Since the optical intensity of the dark soliton lightwave need not always be zero at the center thereof, it is also possible to slightly reduce the output of the optical amplifier 114 to produce a lightwave whose optical intensity does not reach zero at the center thereof. In this instance, the phase shift amount by the optical phase modulator 4 needs only to be set to a value smaller than $\pi$.

By controlling the polarization controller 119 in the non-linear optical fiber or loop mirror (FIG. 2) to make the planes of polarization of the two outputs to the 3-dB optical coupler 120 cross at right angles to each other, the outputs to the ports $P_{3a}$ and $P_{3b}$ of the exclusive-OR optical gate 3 can be reversed from those in the above; hence, an intensity or ON-OFF reversed dark soliton lightwave of the bright soliton lightwave can be taken out via the port $P_{3b}$.

In this embodiment, the exclusive-OR optical gate 3 uses the dispersion shifted optical fiber as the optical fiber in the non-linear optical loop mirror (a Sagnac interferometer), but the optical fiber may be replaced by an optical fiber having two polarization maintaining fibers of the same length connected with their main axes perpendicularly intersecting, in which case, by launching the right soliton lightwave into the optical fiber at 45° to the main axes of the polarization maintaining fibers, the intensity or ON-OFF reversed lightwave of the bright soliton lightwave can be obtained regardless of the state of polarization of the CW laser lightwave.

Figure 3:
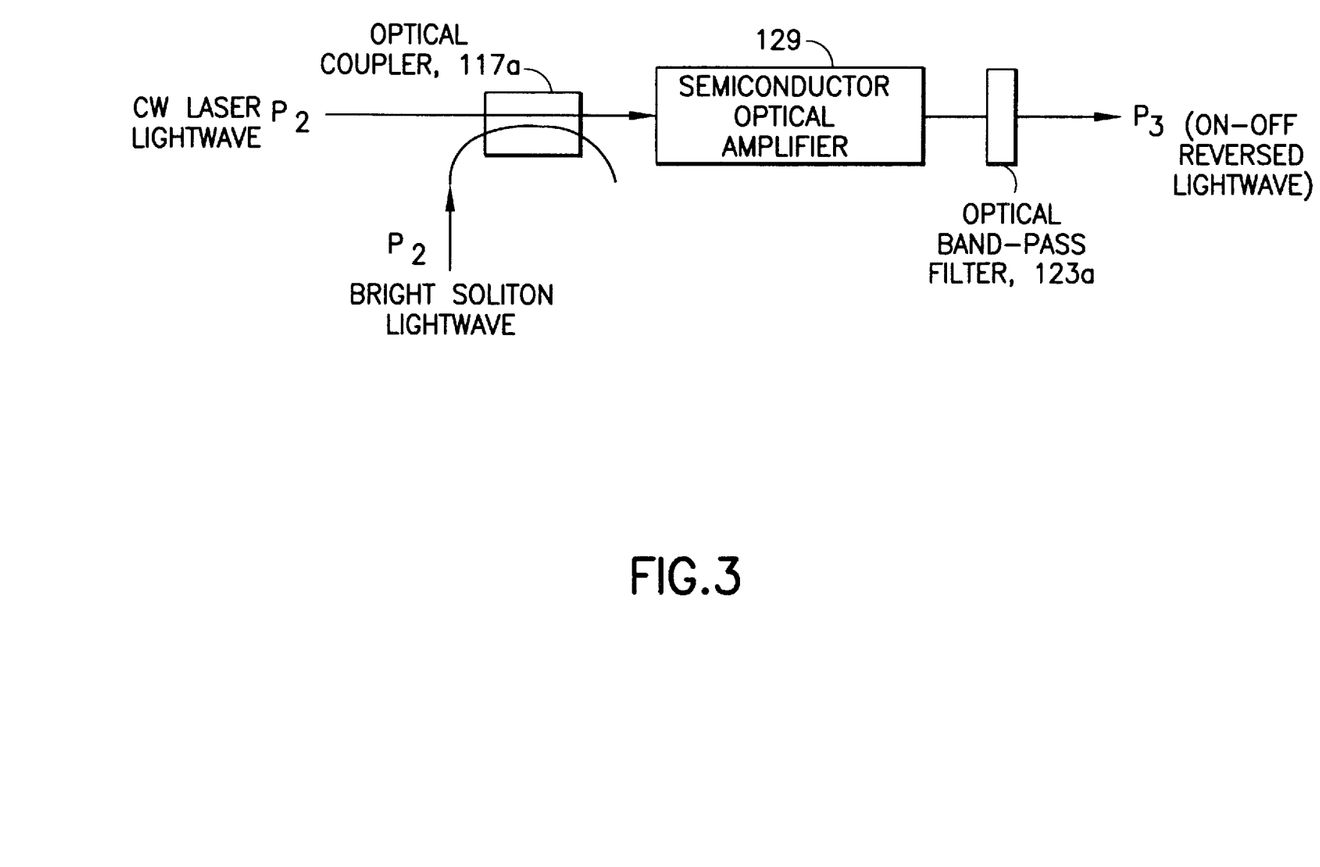
FIG. 3 is a block diagram showing an exclusive-OR optical gate for use in the present invention which employs a semiconductor optical amplifier.

FIG. 3 shows another example of the exclusive-OR optical gate 3, which utilizes a cross gain saturating phenomenon of a semiconductor optical amplifier, in which the gain of the one wavelength is modulated in accordance with the optical intensity of the other wavelength. As shown in FIG. 3, the CW laser lightwave and the bright soliton lightwave (acting as pumping lightwave) are applied via an optical coupler 117$a$ to a semiconductor optical amplifier 129, and only the CW laser lightwave component is passed through an optical band-pass filter 123$a$, from which the same dark soliton lightwave as in the above can be obtained.

Figure 4:
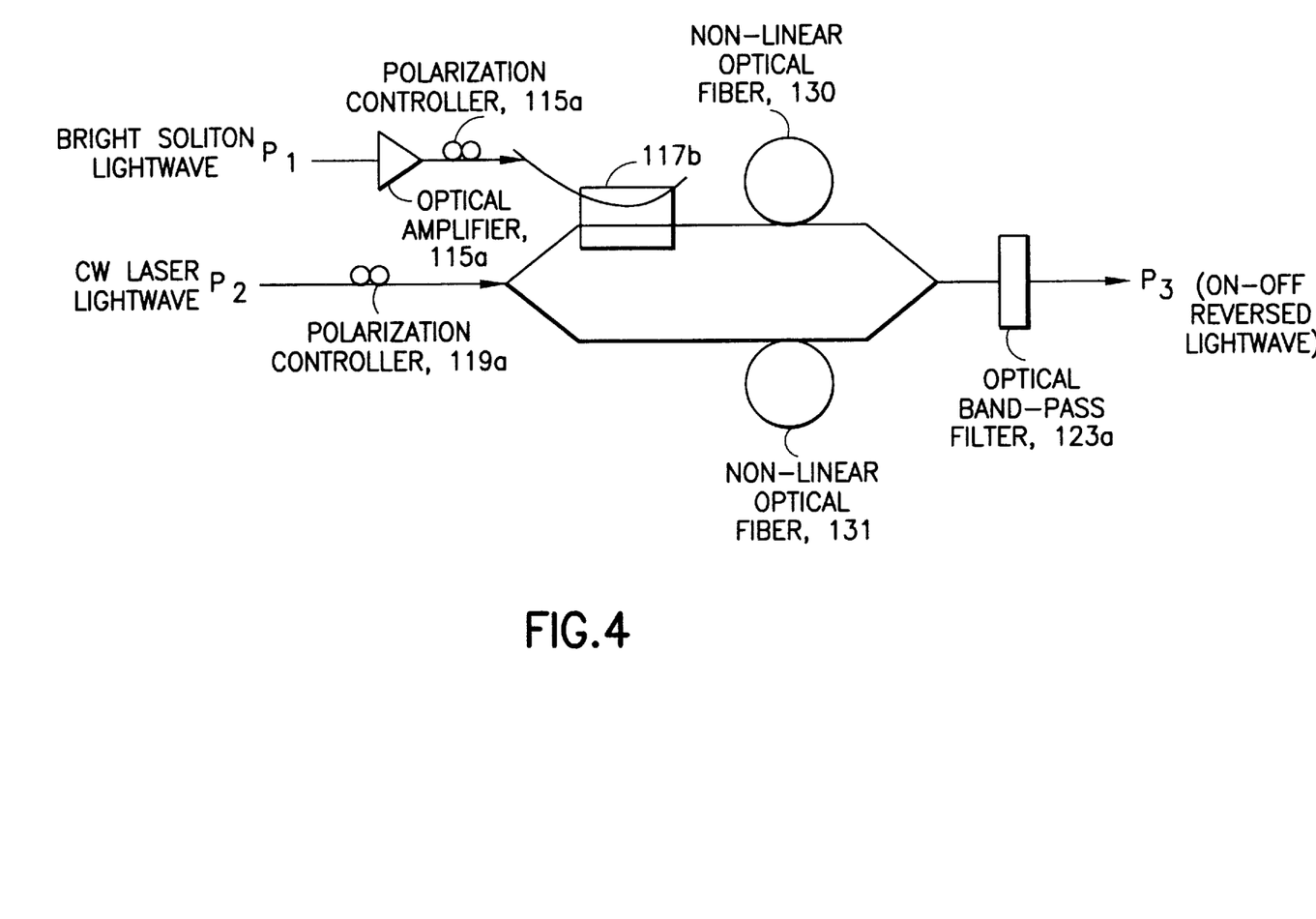
FIG. 4 is a block diagram showing an exclusive-OR optical gate for use in the present invention which employs a non-linear Mach-Zehnder interferometer.

FIG. 4 shows another example of the exclusive-OR optical gate 3, in which non-linear optical fibers 130 and 131 of the same length form a Mach-Zehnder interferometer. The CW laser lightwave is inputted via a polarization controller 119a and the bright soliton lightwave (acting as pumping lightwave) is applied via an optical amplifier 114a a polarization controller 115a and an optical coupler 117b to the interferometer, from which the dark soliton lightwave can be obtained as in the above.

Figure 5:
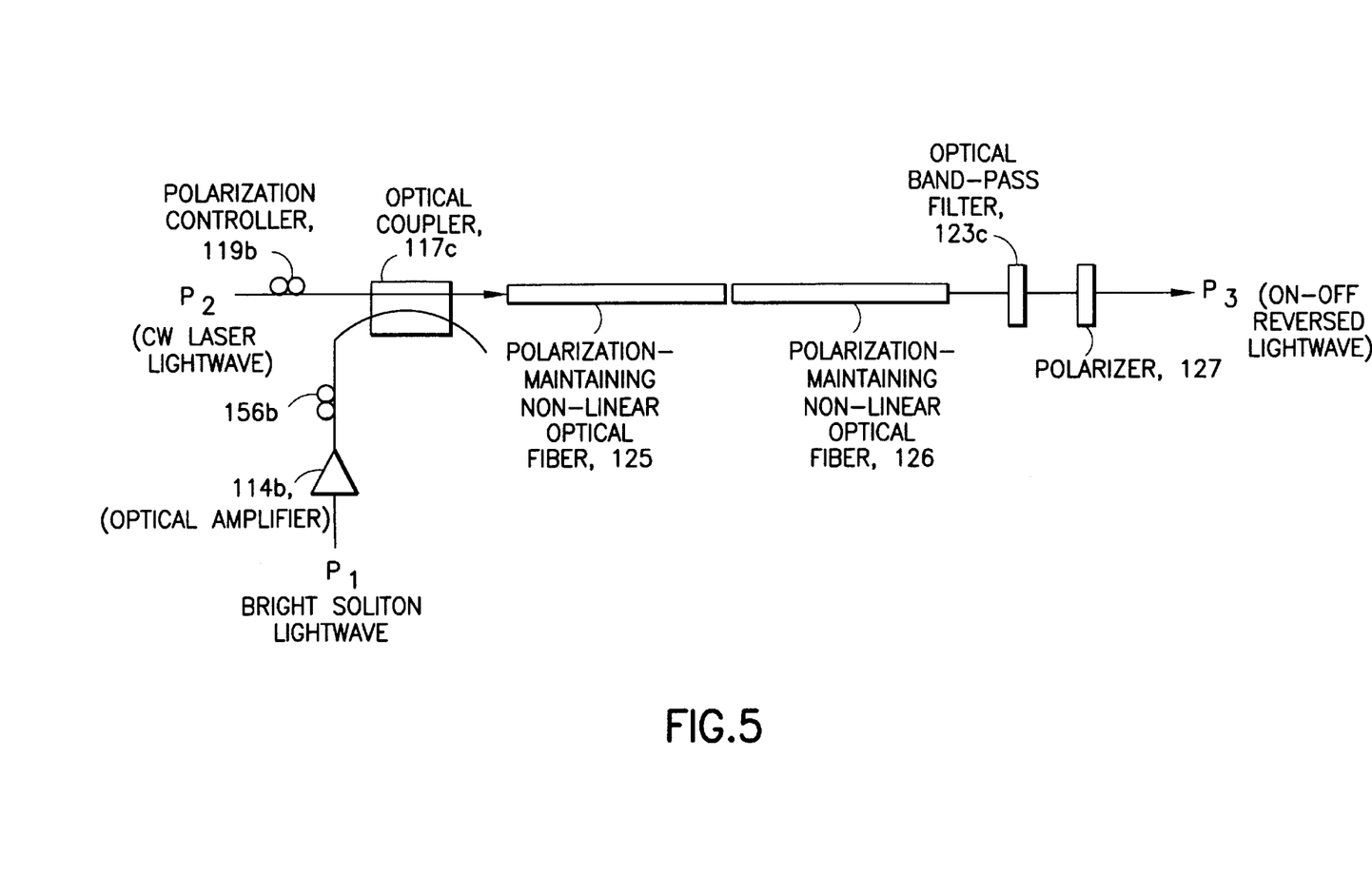
FIG. 5 is a block diagram showing an exclusive-OR optical gate for use in the present invention which utilizes an optical Kerr shutter.

In the optical fiber, the plane of signal lightwave rotates in proportion to the intensity of the pumping light in accordance with the optical Kerr effect. Through utilization of this phenomenon, such an optical Kerr shutter as shown in FIG. 5 can also be used as the exclusive-OR optical gate 3. The plane of polarization of the bright soliton lightwave, which is inputted as pumping light via an optical amplifier 114b, a polarization controller 115b and an optical coupler 117c, is held in agreement with the main axis of an optical fiber formed by two polarization maintaining fibers 125 and 126 of the same length interconnected with their main axes perpendicularly intersecting. In this case, when the CW laser lightwave is applied to the optical fiber at 45° to its main axis via a polarization controller 119b, the plane of polarization of the CW laser lightwave rotates in accordance with the optical intensity of the bright soliton lightwave. Hence, by taking out at the optical fiber output end only the CW laser lightwave modulated in an optical band-pass filter 123c and by inputting it into a polarizer 127 having its polarizing plane held in agreement with the plane of polarization of the input CW laser lightwave, it is possible to obtain the ON-OFF reversed dark lightwave of the bright soliton lightwave at the output of the polarizer.

According to this embodiment, the multiplexed bright soliton lightwave transmitted as the dark soliton lightwave can be demultiplexed, at the receiving end, into the original lightwave for reception. In this instance, the transmitted dark soliton lightwave can be processed with the optical pulse density reduced. This allows ease in lessening the influence of the timing jitter contained in the transmitted lightwave which is exerted on the code error rate.

[Embodiment 2]

Figure 7:
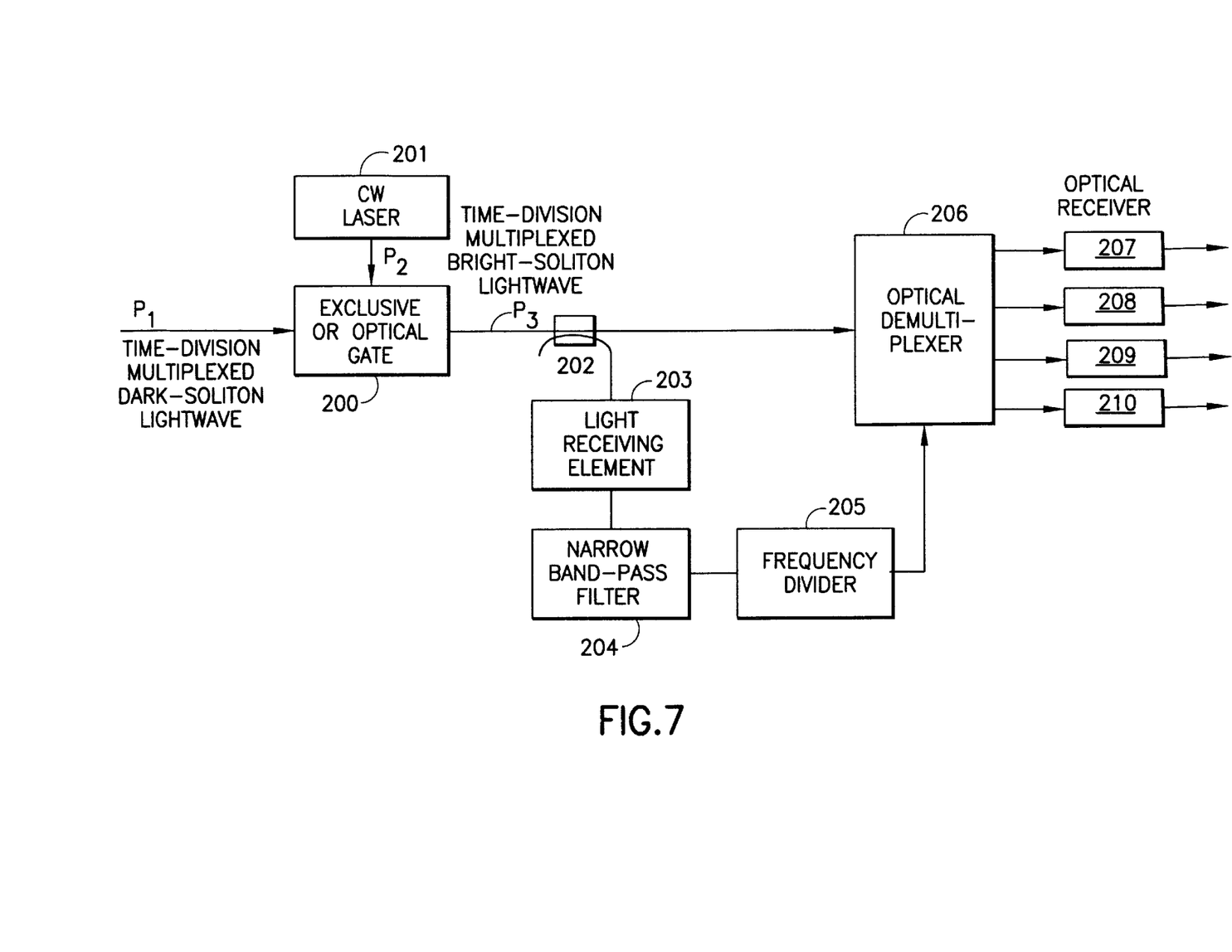
FIG. 7 is a block diagram explanatory of a first dark soliton optical receiver according to Embodiment 2 of the present invention.

FIG. 7 illustrates an embodiment of the optical receiver according to the present invention. This receiver comprises an exclusive-OR optical gate 200, a CW laser 201, an optical coupler 202, a light receiving element 203, a narrow band-pass filter 204, a frequency divider 205, an optical demultiplexer 206 and optical detectors or receivers 207, 208, 209 and 210. A time-division four-multiplexed 20-Gb/s dark soliton lightwave and the output from the CW laser 201 are inputted into the exclusive-OR optical gate 200, whereby the CW laser lightwave is converted to an ON-OFF reversed time-division multiplexed bright soliton lightwave of the dark soliton lightwave. The time-division multiplexed lightwave is branched by the optical coupler 202 into two routes. The one branched lightwave is converted by the light receiving element 203 into an electric signal, which is fed to the narrow band-pass filter 204, wherein its 20-Gb/s clock frequency component is extracted. The thus extracted component is converted by the frequency divider 205 to the original 5-Gb/s clock frequency. The other branched lightwave and the 5-Gb/s clock signal are fed to the optical demultiplexer 206, wherein they are demultiplexed into four 5-Gb/s bright soliton lightwaves, and they are applied to the optical detectors or receivers 207, 208, 209 and 210 for data reconstruction. The optical demultiplexer 206 can be implemented by forming a 25-ps-wide optical gate synchronized with the original unmultiplexed signal by the use of four electro-absorption type optical modulators. The optical demultiplexing may also be carried out by the use of the optical ANDing operation of the non-linear optical loop mirror shown in FIG. 2.

[Embodiment 3]

Figure 8:
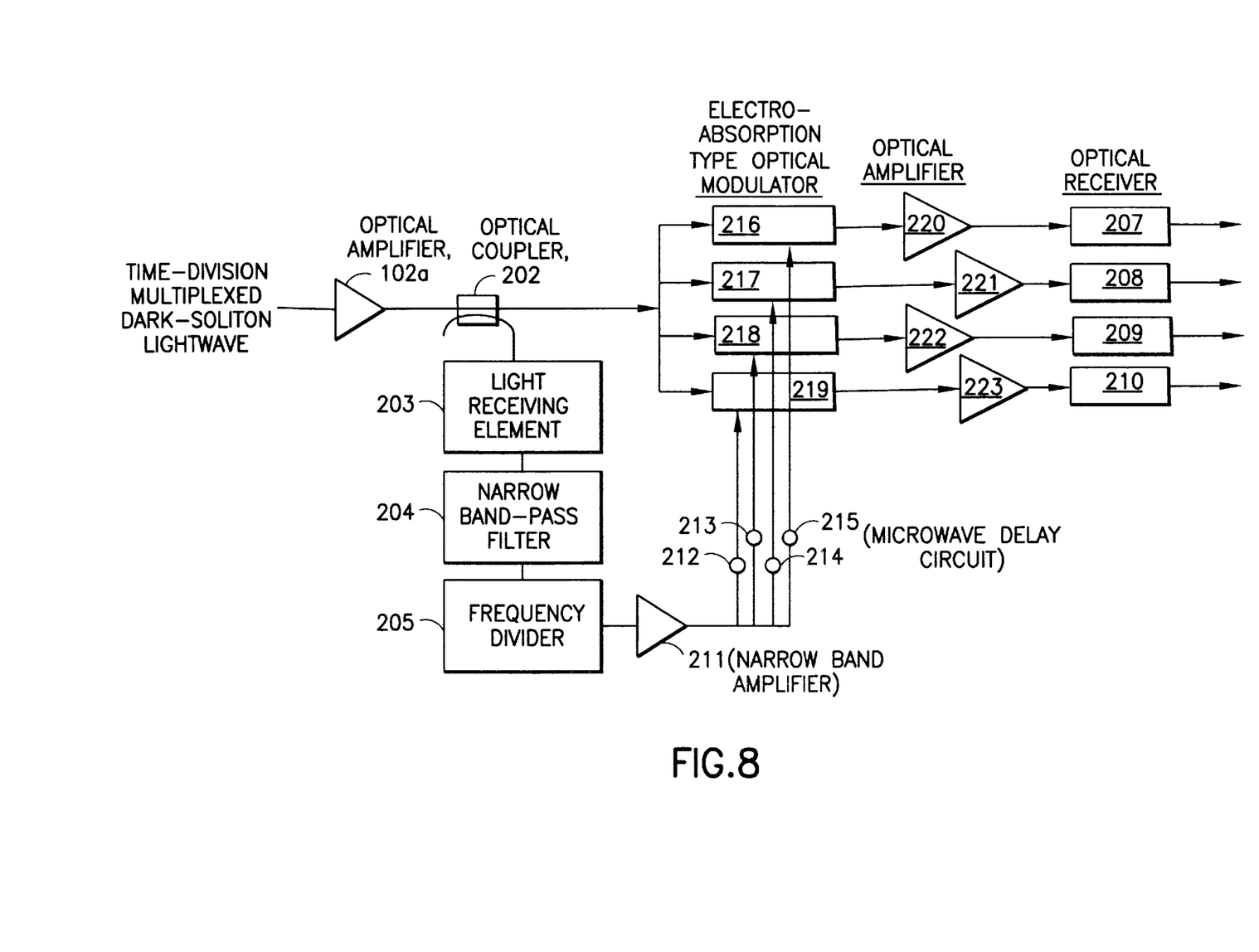
FIG. 8 is a block diagram explanatory of a second dark soliton optical receiver according to Embodiment 3 of the present invention.

FIG. 8 illustrates another embodiment of the optical receiver according to the present invention. In the embodiment of FIG. 7 the dark soliton lightwave is converted to the bright soliton lightwave, followed by demultiplexing by the optical demultiplexer 206; in this embodiment, however, the conversion of the dark soliton lightwave to the bright soliton lightwave and its optical demultiplexing take place at the same time.

The time-division multiplexed dark soliton lightwave is fed via an optical amplifier 102a to the optical coupler 202, from which it is branched into two routes. The one branched lightwave is converted by the light receiving element 203, to an electric signal, which is applied to the narrow band-pass filter 204 to extract the 20-Gb/s clock frequency component, which is converted by the frequency divider 205 to the original clock frequency signal, and this clock frequency signal is amplified by a narrow band amplifier 211. The other branched lightwave is applied to four electro-absorption type optical modulators 216, 217, 218 and 219. These optical modulators are driven by sinusoidal voltages of the above-mentioned 5-Gb/s clock frequency which are delayed by microwave delay circuits 212, 213, 214 and 215 so that they are synchronized with the original unmultiplexed lightwave, and so that the optical modulators each form, with a period of 100 ps an optical gate of substantially the same gate width as the pulse width of the bright soliton lightwave. In case of passing the multiplexed lightwave through the optical modulator, the light level corresponding to the optical gate is outputted intact at a part of the fixed-amplitude lightwave where no dark pulse is contained so that a bright pulse is formed. However, at the part where a dark pulse is contained, if the gate waveform is an ON-OFF reversed one of the dark pulse, then no output is provided. In the other three optical sequences no signals are outputted since the optical modulators are in the OFF state. Hence, the output from each optical modulator is a pulse ON-OFF reversed from the multiplexed dark pulse and demultiplexed as the original bright soliton lightwave. The 5-Gb/s bright soliton lightwaves of the four routes are amplified by optical amplifiers 220, 221, 222 and 223 and applied to the optical detectors or receivers 207, 208, 209 and 210 for data regeneration.

[Embodiment 4]

Figure 9:
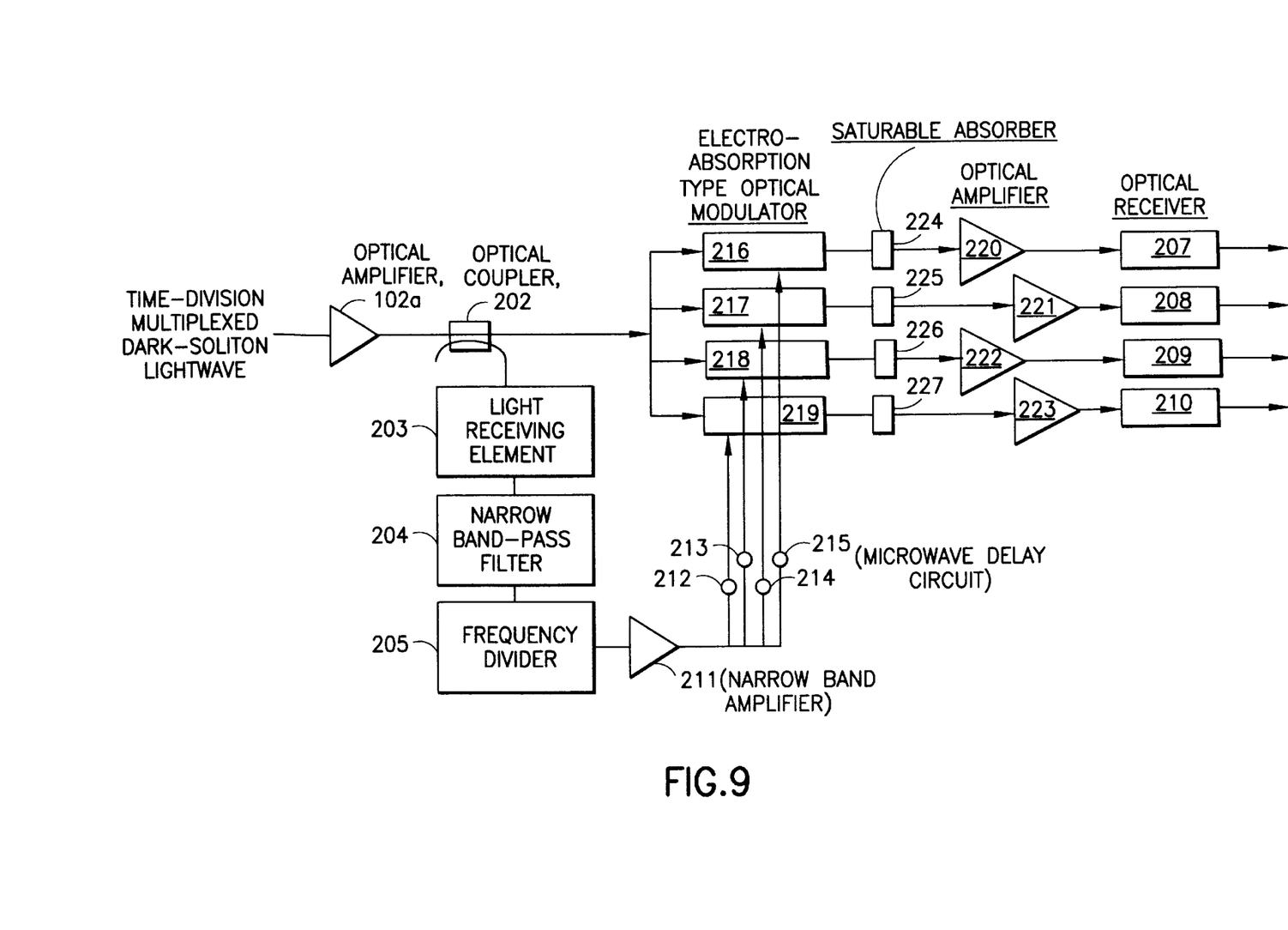
FIG. 9 is a block diagram explanatory of a third dark soliton optical receiver according to Embodiment 4 of the present invention.
Figure 10:
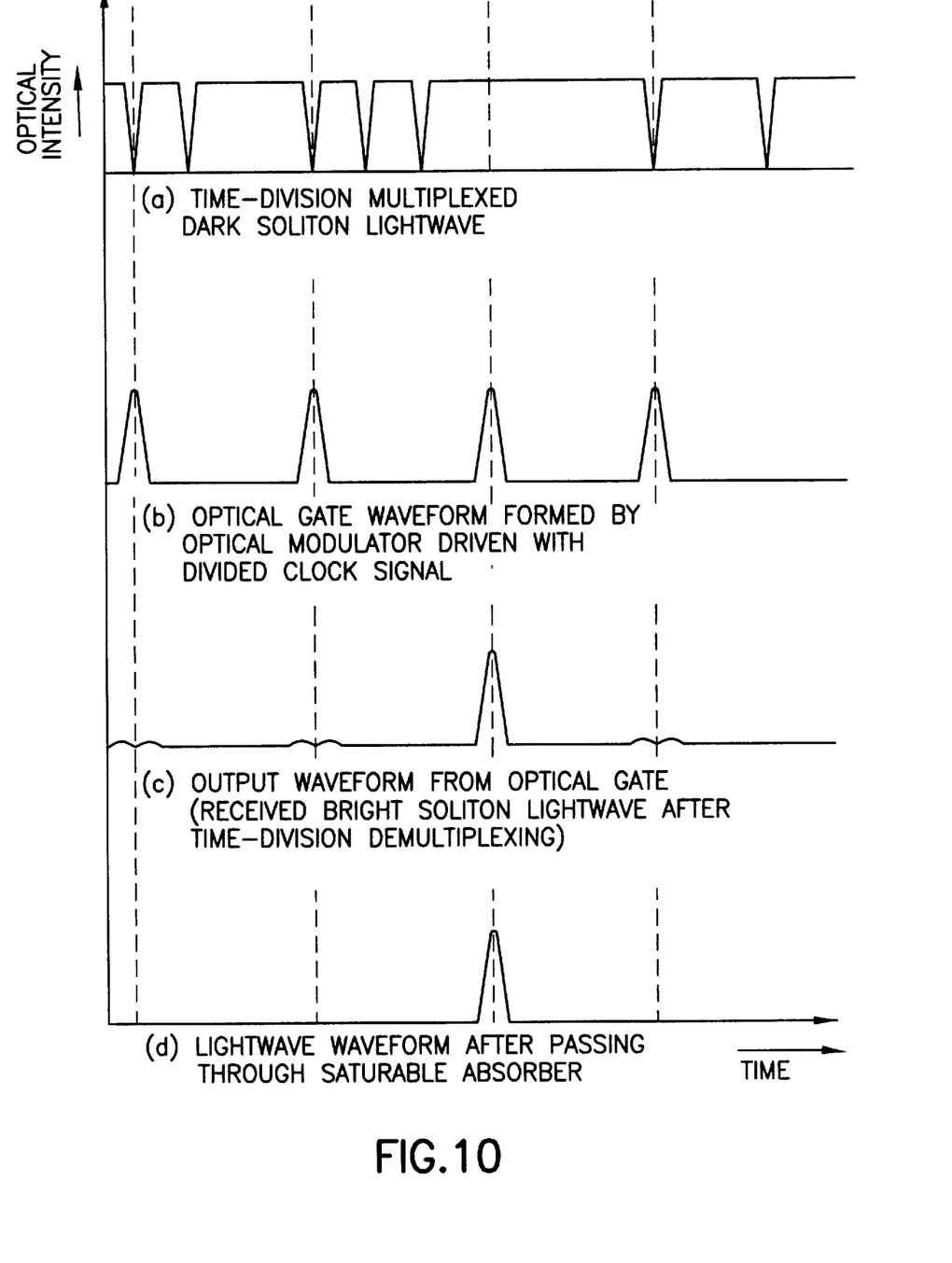
FIG. 10 shows time charts explanatory of the operation of Embodiment 3 of the dark soliton optical receiver according to the present invention.

FIG. 9 illustrates still another embodiment of the optical receiver according to the present invention. This embodiment differs from Embodiment 3 in that saturable absorbers 224, 225, 226 and 227 are connected to the outputs of the optical modulators 216, 217, 218 and 219, respectively. In Embodiment 3, at the part where the dark pulse is present, the gate waveform is set to an ON-OFF reversed waveform of the dark pulse to make the output zero, but when the dark pulse includes timing jitter or when the gate waveform does not accurately correspond to the dark pulse waveform, a residual error component is outputted. In this embodiment, this residual error component is removed by the saturable absorbers 224, 225, 226 and 227 whose absorption coefficients decrease with an increase in optical intensity. This prevents errors resulting from the timing jitter and increases the extinction ratio of the lightwave.

[Embodiment 5]

Figure 11:
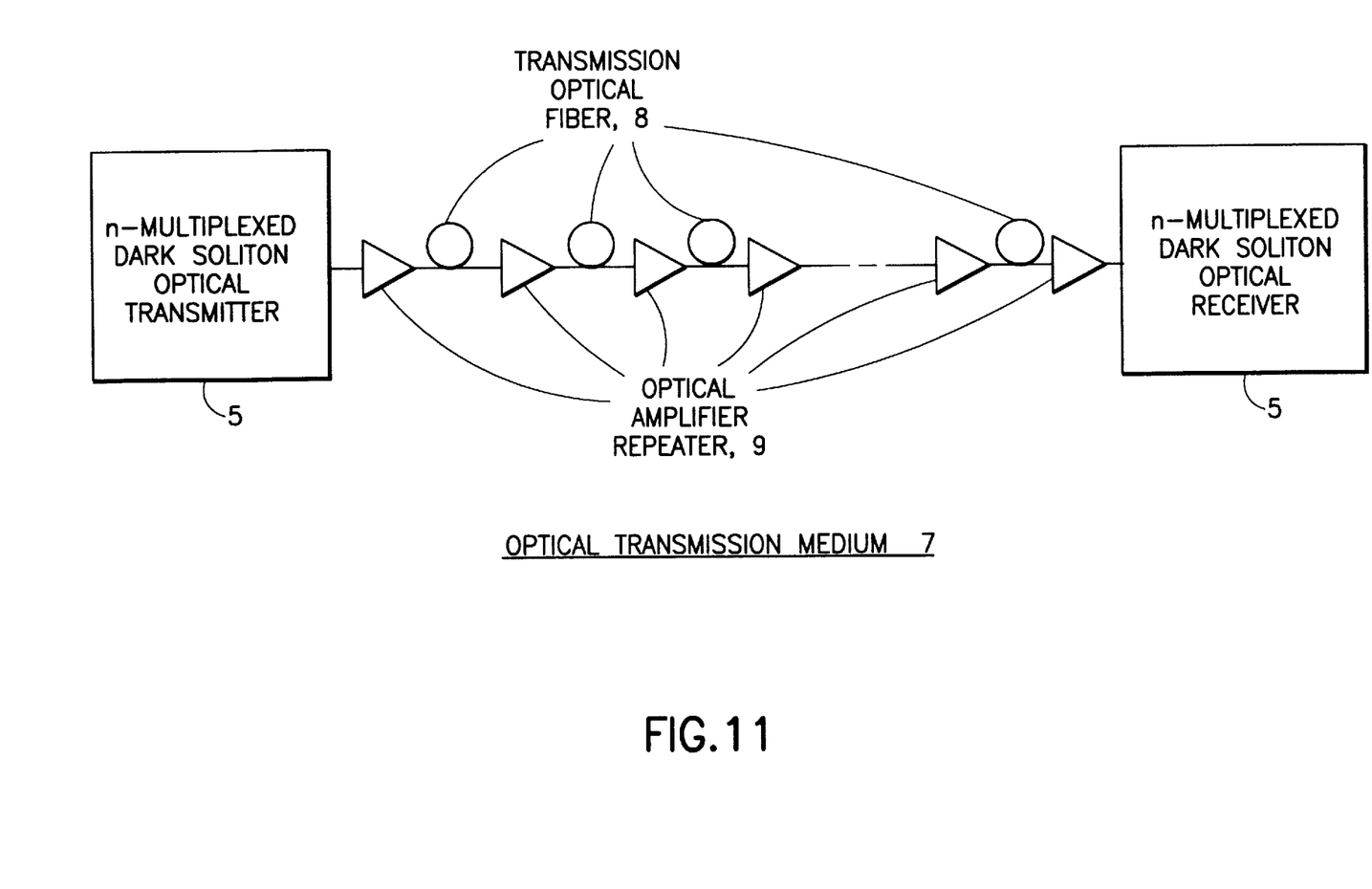
FIG. 11 is a block diagram explanatory of the optical communication system according to Embodiment 5 of the present invention.

FIG. 11 illustrates an embodiment of the optical communication system according to the present invention. Reference numeral 5 denotes an n-multiplexed dark soliton optical transmitter, 6 an n-multiplexed dark soliton optical receiver, and 7 an optical transmission medium formed by transmission optical fibers and optical amplifier repeaters which compensate for losses by the optical fibers. In this embodiment, the transmission rate before multiplexing is 5 Gb/s and the multiplexity n is 4.

The four-multiplexed dark soliton optical transmitter 5 and the four-multiplexed dark soliton optical receiver 6 are implemented by the optical transmitter (Embodiment 1) and the optical receiver (Embodiment 4) of the present invention described previously. The total length of the transmission optical fiber 8 in the optical transmission line 7 is about 9000 km, and the average wavelength dispersion is set to a value of −0.05 ps/km/nm in terms of the normal dispersion value. A total of 300 optical amplifier repeaters using erbium-doped fibers are each installed in each span of 30 km or so to compensate for each loss by the respective optical fibers. The pulse width of the dark pulse for transmission is set to 10 ps, and in order that the average optical output power of each repeater section may satisfy the soliton condition, the average optical output power of each optical amplifier repeater is set to a value of 3 dBm. The average value of timing jitter of the dark soliton lightwave after a 9000 km transmission is 4.8 ps; if this is left intact, no error-free reception can be achieved. However, this embodiment employs the receiver almost free from the influence of timing jitter, and hence permits the reception operation with an error rate below $10^{-9}$.

As described above in detail, the present invention permits the implementation of dark soliton optical transmitter and receiver and an optical communication system using them and substantially free from the limitations by timing jitter. Furthermore, since a simple-structured optical transmission line formed by a combination of optical fibers and optical amplifiers can be used, it is possible to realize a reliable, superfast long-distance optical communication. Thus, this invention system is remarkably effective in the realization of a practical soliton transmission system.

What we claim is:

1. An optical receiver device for dark soliton lightwave comprising:

an input terminal for receiving a dark soliton lightwave carrying digital information having ON-OFF states reversed to ON-OFF states of a bright soliton lightwave of return-to-zero optical pulses to be transmitted;

constant-amplitude lightwave generating means for generating a lightwave of a constant amplitude;

optical gate means for receiving said dark soliton lightwave and the lightwave of a constant amplitude from said constant-amplitude lightwave generating means and for converting said lightwave of a constant amplitude to a bright soliton lightwave having reversed the ON-OFF state of said dark soliton lightwave, said optical gate means having a function of outputting an optical output corresponding to exclusive OR of two inputs thereto; and optical detector means for converting the optical output from said optical gate means to an electric signal.

2. An optical receiver device for dark soliton lightwave comprising:

an input terminal for receiving a dark soliton lightwave carrying digital information having ON-OFF states reversed to ON-OFF states of a bright soliton lightwave of return-to-zero optical pulses to be transmitted;

frequency divider means for frequency-dividing said dark soliton lightwave to an electric signal of a clock frequency;

an optical modulator for modulating said reversed dark soliton lightwave by said electric signal of said clock frequency from said frequency divider means to obtain a bright soliton lightwave having reversed the ON-OFF state of said dark soliton lightwave carrying digital information; and optical detector means for converting said bright soliton lightwave carrying digital information, supplied from said optical modulator, to an electric signal.

* * * * *